(12) United States Patent
Miller et al.

(10) Patent No.: US 7,497,305 B2
(45) Date of Patent: Mar. 3, 2009

(54) BRAKE CONDITION MONITORING

(75) Inventors: Richard John Miller, Coventry (GB); Ross John Marshall, Dunoon (GB); David Alexander Bailey, Stratford-upon Avon (GB); Nicholas Charles Griffin, Norton Lindsey (GB)

(73) Assignee: Meggitt Aerospace Limited, Coventry (GB)

( * ) Notice: Subject to any disclaimer, the term of this patent is extended or adjusted under 35 U.S.C. 154(b) by 0 days.

(21) Appl. No.: 11/411,305

(22) Filed: Apr. 26, 2006

(65) Prior Publication Data

US 2007/0007088 A1  Jan. 11, 2007

Related U.S. Application Data

(62) Division of application No. 10/343,131, filed as application No. PCT/GB01/03494 on Aug. 3, 2001, now Pat. No. 7,086,503.

(30) Foreign Application Priority Data

Aug. 4, 2000 (GB) .................................. 0019250.0
Dec. 19, 2000 (GB) .................................. 0030927.8

(51) Int. Cl.
   *F16D 66/00* (2006.01)
(52) U.S. Cl. .............................. 188/1.11 E; 188/79.52; 303/122.03; 244/111
(58) Field of Classification Search ........... 188/1.11 W, 188/1.11 L, 1.11 E, 1.11 R, 79.51, 79.52; 340/449, 453, 454; 374/7, 110, 111, 135, 374/163, 179; 377/15, 16, 25; 701/29, 30; 303/122, 122.03, 122.02, 122.04, 122.08, 303/DIG. 3; 244/110 A, 111
See application file for complete search history.

(56) References Cited

U.S. PATENT DOCUMENTS

| 4,712,422 | A | * | 12/1987 | Munro ........................ 73/129 |
| 4,790,606 | A | * | 12/1988 | Reinecke ..................... 303/191 |
| 4,923,056 | A | * | 5/1990 | Nedelk ....................... 188/71.1 |
| 5,201,834 | A | * | 4/1993 | Grazioli et al. .......... 246/169 R |
| 5,217,282 | A | * | 6/1993 | Guichard .................... 303/9.73 |
| 5,581,464 | A | * | 12/1996 | Woll et al. ..................... 701/35 |
| 5,651,431 | A |   | 7/1997 | Kyrtsos |

(Continued)

FOREIGN PATENT DOCUMENTS

DE           3820306 A1    12/1989

(Continued)

*Primary Examiner*—Pam Rodriguez
(74) *Attorney, Agent, or Firm*—Caesar, Rivise, Bernstein, Cohen & Pokotilow, Ltd.

(57) ABSTRACT

A system and method for monitoring the applications of carbon-carbon brakes of an aircraft to determine brake condition and operate a brake maintenance program or charge a brake system user. The system and method includes monitoring each actuation of the brakes and making a separate record of each actuation of the brakes in which there is relative movement of the facing friction surfaces that cause wear, and from that separate record determining brake usage. The monitoring may include measuring changes and processing the signals to distinguish between those which fall below and those which are above a threshold value. The method and system may comprise sensing a plurality of braking parameters having values dependent upon the wear in the system and different faults of the system, and identifying and recording wear and faults based on combinations of values of the parameters.

16 Claims, 4 Drawing Sheets

U.S. PATENT DOCUMENTS

| | | |
|---|---|---|
| 5,730,526 A | 3/1998 | Davis |
| 5,984,433 A | 11/1999 | Stumpe |
| 6,250,430 B1 * | 6/2001 | Kyrtsos .................. 188/1.11 L |
| 6,299,261 B1 * | 10/2001 | Weiberle et al. .............. 303/20 |
| 6,310,545 B1 | 10/2001 | Sapir |
| 6,471,015 B1 * | 10/2002 | Ralea et al. ............. 188/1.11 L |
| 6,478,252 B1 * | 11/2002 | Stimson et al. ............. 244/111 |
| 6,655,502 B2 * | 12/2003 | Sokoll et al. ........... 188/1.11 W |
| 6,659,233 B2 * | 12/2003 | DeVlieg ................ 188/1.11 E |
| 6,680,672 B2 * | 1/2004 | Borugian .................... 340/584 |
| 7,086,503 B2 * | 8/2006 | Miller et al. ............ 188/1.11 L |

FOREIGN PATENT DOCUMENTS

| | | |
|---|---|---|
| EP | 0566005 A1 | 4/1993 |
| EP | 0729018 A2 | 8/1996 |
| WO | 9829672 | 7/1998 |
| WO | 9850711 | 11/1998 |

\* cited by examiner

BRAKE CONDITION MONITORING

BACKGROUND OF INVENTION

This invention relates to a system and method for monitoring brake applications, more particularly but not exclusively monitoring the application of the brakes of an aircraft, for example, to determine the condition of the brakes. The invention also relates to a system for operating a braking system maintenance program and to a system for charging a user of a braking system.

Carbon-carbon brake discs are commonly used in aircraft brakes. The service life of a carbon-carbon brake is commonly quoted in terms of the number of landings the brake discs are expected to achieve before replacement, the number of landings being routinely logged for maintenance and airworthiness requirements. The expected number of landings is commonly used as a guarantee of minimum service life for heat packs that are sold or to calculate the cost per brake landing (CBL) where brake heat packs are leased to operators by the brake manufacturers.

Aircraft brakes, especially those employing carbon-carbon composite materials as the friction discs in a multi-disc arrangement, may suffer damage that can affect the performance of the brake during service. Routine inspection of brakes between scheduled services includes inspecting the wear pin to ensure sufficient material is available to enable the heat pack to safely absorb the energy of a stop without overheating and damage to the heat pack and surrounding components. Inspection of the wear pin will only reveal when the heat pack is reaching the end of its wear life and will not show other problems that can adversely affect performance of the brake such as broken discs, missing drive tenons, oxidation, uneven disc wear, brake drag or contamination.

It is desirable to have accurate information for determining the condition and predicting the life of carbon-carbon brake discs. This is important for safety as well as commercial reasons. For example, the high cost of carbon-carbon brake discs and delivery lead times in the order of six months makes provisioning of spares an important issue if inventory and hence working capital is to be minimized.

In use aircraft brakes are applied in five situations: when landing, when taxiing, when stationary, during pre-retract braking and, very rarely, during a rejected take off. This is an important point, for example, because it has been realized that the rate of wear of a carbon brake is dependent to a major extent on the number of brake operations effected and not on the energy dissipated during the operation. Thus, the wear during a taxi snub on a cold carbon-carbon brake is similar to that of a full landing.

The prior art relating to brake monitoring includes DE-A-3433236 which discloses a brake application monitoring device intended for use in vehicle or aircraft. This device comprises a chart recorder with traces driven by a transducer measuring the brake force, e.g. by sensing the hydraulic pressure applied, and an intertial sensor responsive to the actual deceleration of the vehicle or aircraft. However, there are several disadvantages with this proposal. For example, the brakes on an aircraft may require an applied pressure of approximately 150 psi (10 bar) simply to close the clearance in the brake before any braking effect is seen. However, a relatively small increase in that applied pressure may be all that is necessary to achieve the desired braking effect for a taxi snub. In many existing systems there is little or no sensing of brake pressure which means that modifications to those systems would be needed if brake pressure is to be used as a means of determining brake application. The use of an inertial sensor is not able to identify all kinds of braking operation carried out, for example check braking against engine thrust, and it might erroneously identify as a braking application a deceleration due to drag, wind effects or throttling back the engines as a braking application.

In the context of a braking system such as an aircraft wheel brake, it is known to measure physical parameters associated with the braking effect during an operation of the system with a view to regulating that effect.

For example, in a hydraulic servo operated aircraft brake system (autobrake) the extent to which the pilot has depressed the brake pedal, i.e. the brake demand, may be measured and the resulting hydraulic pressure applied to the brakes regulated to a value appropriate to the demand. In more complex examples, further parameters are measured. Thus, U.S. Pat. No. 4,790,606 to Reinecke discloses apparatus for measuring and/or regulating a braking force, which apparatus includes a deceleration sensor, a brake temperature sensor, a mass sensor and an evaluation means which uses the signals from these sensors to achieve the measurement and/or regulation. U.S. Pat. No. 4,592,213 to Rapoport discloses a braking system comprising temperature, friction and pressure sensors and means for comparing the signals from these sensors with predetermined values and automatically operating the braking system accordingly. U.S. Pat. No. 4,572,585 to Guichard and U.S. Pat. No. 4,043,607 to Signorelli et al also disclose systems of such a nature.

In some cases, the existence of excessively inefficient braking is signaled, e.g. by a warning signal to the pilot of an aircraft.

SUMMARY OF THE INVENTION

According to the invention there is provided a brake condition monitoring system and method in accordance with the claims.

The invention could be applied to an existing or new aircraft by the addition to the brake of a stand-alone unit with its own power supply or an external power supply from the aircraft systems. Alternatively, brake control hardware and/or software could be modified to incorporate the system into existing and new aircraft.

Methods for data storage and downloading such stored information are well known. The information on brake usage could be downloaded at some convenient time such as during maintenance of the aircraft. Data could be read directly from a visual display or downloaded to a portable facility for analysis later. Alternatively the recording unit could be removed for analysis at another site. The information could also be stored, for example, on a memory card that would be easier to remove than the whole unit.

The system of the invention could utilize the current antiskid control unit (ASCU) by including extra algorithms within the current software, or a stand-alone box that could be positioned either on the brake or somewhere within the aircraft. Different parameters (hydraulic pressure, temperature, wheel speed, torque, pedal deflection, brake wear) could be used within algorithms to detect when an application has taken place and possibly what kind of application it was. The recorded information could be downloaded for analysis of the brake usage and the information could be used for maintenance, spares provisioning and/or charging purposes.

Information downloaded from the system could be used to build a detailed picture over a period of time of brake usage for each airline operating an aircraft type. This information could then be used to accurately predict when maintenance will be required and when heat packs will need changing. This will allow more accurate provisioning of heat pack spares, reducing inventory of these expensive carbon discs at the airline and brake manufacturer and hence reducing operating costs.

Information downloaded from the system could be used to give more reliable guarantees of brake service life by accounting for the wear due to different types of brake usage. The information could alternatively be used to extend a CBL payment scheme to charge for all brake applications, rather than only landings, with the charge for each brake application related to the type of usage and associated wear.

The monitoring system could be an additional unit added to the aircraft or it could be incorporated into the existing brake management control system.

Congestion at many airports results in a considerable number of brake applications during taxiing where relatively little energy is dissipated compared with that dissipated during a landing run. This high number of brake applications during taxi braking can considerably reduce the expected life of the carbon brake disc heat pack. This can result in additional cost for aircraft operators where expected brake life is not achieved. Where operators pay for brakes on a CBL basis, an airline that averages only two taxi snubs per landing sequence would be charged the same CBL rate as an airline that operated from busier airports and averaged 20 snubs per sequence. If information on the type of brake application could be recorded a more detailed picture of an aircraft's brake usage could be built up to assist stock control and develop a pricing scheme reflecting brake usage. A knowledge of the factors influencing brake life could also be used by airlines to educate pilots in brake techniques to extend brake life and reduce operating costs.

When the aircraft is stationary there is no relative rotational movement of contacting friction surfaces and, as applications of the brakes will not generate wear of the carbon, it may be decided that it is not desirable to record these applications. The difference between applications of the brakes while stationary and applications where the aircraft is moving can be ascertained by a system that considers the aircraft speed at the moment the brake is applied to considers the conversion of kinetic energy to heat. If the aircraft speed, measured for example by the signal from a wheel speed transducer, is below a certain threshold value the aircraft can be considered to be stationary and the brake application will not be logged/recorded. If the aircraft speed is equal to or above the threshold value the application of the brake will be recorded to provide information on brake usage.

During a brake application the braking energy is dissipated through the brake as heat. Therefore, it is theoretically possible to sense even the slightest brake application through the change in brake temperature. Temperature sensors are routinely incorporated in brake units so it is possible to sense brake applications within the system with no or limited modification to existing brakes. The brake temperature signal can be processed to give reliable indications of all brake applications.

As noted, aircraft brakes may be applied in five different situations; when landing, when taxiing, when stationary, during pre-retract braking and, occasionally, during a rejected take-off. Each type of brake application is carried out within a respective range of inputs, for example brake fluid pressure, pilot pedal deflection or wheel speed and each type of brake application should produce a relatively predictable response from the brake in terms of outputs such as, for example, heat pack temperature rise or torque generated.

The brake demand inputs are monitored and processed to predict expected brake outputs. The actual outputs are also monitored and compared with the expected or predicted outputs to derive information on the condition of the brake. Such information could be used to predict service life or detect problems that might lead to unscheduled maintenance or premature brake heat pack removal.

Preferably the system will predict the expected brake outputs from the measured inputs and compare such expected outputs with the measured outputs. Where there is a variation between expected and measured outputs the system will determine whether the variation is the result of a defect in the condition of the brake actuator or brake heat pack.

Such a system for monitoring the condition of the brakes could be carried out within the brake control system, with the addition of hardware or software as necessary. Alternatively, monitoring could be carried out within a dedicated condition-monitoring unit fitted to the aircraft and receiving signals from brake control system hardware components and additional hardware components if required.

The system can include means to alert the pilot or ground personnel if a fault in the brake condition is detected to allow maintenance to be carried out at the earliest opportunity so as to minimize the risks to aircraft safety and increase aircraft dispatchability. For alerting the pilot to any fault a display could be provided in the cockpit. Personnel on the ground could be alerted to any detected faults by a display on or from the brake control system or dedicated condition monitoring system during pre-flight checks or by a signal to a ground base.

Signals that could be monitored and processed to provide a brake "signature" from which information on brake condition can be derived include but are not limited to pilot pedal deflection, brake fluid pressure, wheel speed, anti-skid activity, brake temperature, brake torque, brake wear, number of brake applications, brake application time, vibration, brake chassis acceleration, acoustic signature, brake odor. In addition, information can be received from other aircraft systems such as, for example, aircraft weight. Some of these signals can be regarded as inputs to the brake and reflect the type of brake application that is called for by the pilot or auto-brake system, for example a landing or taxi snub. Such inputs include but are not limited to pilot pedal deflection or auto brake demand, brake fluid pressure, brake application time and wheel speed. Other monitored signals can be regarded as outputs resulting from the brake application and condition of the brake. Such outputs include but are not limited to brake torque, brake temperature, vibration, acoustic signature, acceleration and brake odor.

Where a brake heat pack is in as new condition with full amount of wearable material available and all disc drive tenons in place the heat pack will have a maximum number of friction surfaces in operation during brake applications. In addition there will be a maximum heat pack mass available to absorb the heat generated during the brake application. From the processing of a combination of some or all measured inputs including but not limited to wheel speed, pilot brake pedal or auto-brake demand, brake fluid pressure and anti-skid activity a number of expected outputs can be determined. Such outputs or brake signature include but are not limited to brake torque, brake temperature, acoustic signal, vibration, acceleration and brake odor.

As the condition of the heat pack changes the monitored output or signature described above will change for any given set of brake inputs.

Such a system could also monitor other aspects of the undercarriage to detect problems related to the wheel and brake. This might involve monitoring for example the temperature of the wheel bearing, the temperature of the tire or the tire pressure.

Looking at a simple and common scenario, if the heat pack is worn there will be less material available to absorb the energy dissipated by any given brake application. This will result in a greater rise in heat pack temperature than would be seen in a new heat pack. The greater the degree of wear, the greater will be the resulting rise in heat pack temperature.

Considering a different scenario, if all the drive tenons on a single rotor disc are broken this will result in the loss of two friction surfaces. In such a case, when compared with a brake with all friction surfaces available, the same brake control system inputs of pilot brake demand, brake fluid pressure, brake application time, wheel speed and anti-skid activity will result in a lower brake torque being generated, less rapid deceleration and a lower increase in temperature. Alternatively, if a deceleration regulating autobrake is in operation, it will act to regulate deceleration for a given pilot demand by controlling the brake fluid pressure. Hence, the main effect of the drive tenons of a rotor disc becoming broken will be an increased brake fluid pressure.

BRIEF DESCRIPTION OF THE DRAWINGS

In order that the invention may be well understood, it will now be described by way of example only with reference to the accompanying diagrammatic drawings, in which.

DETAILED DESCRIPTION OF THE PREFERRED EMBODIMENT

Figure 1:
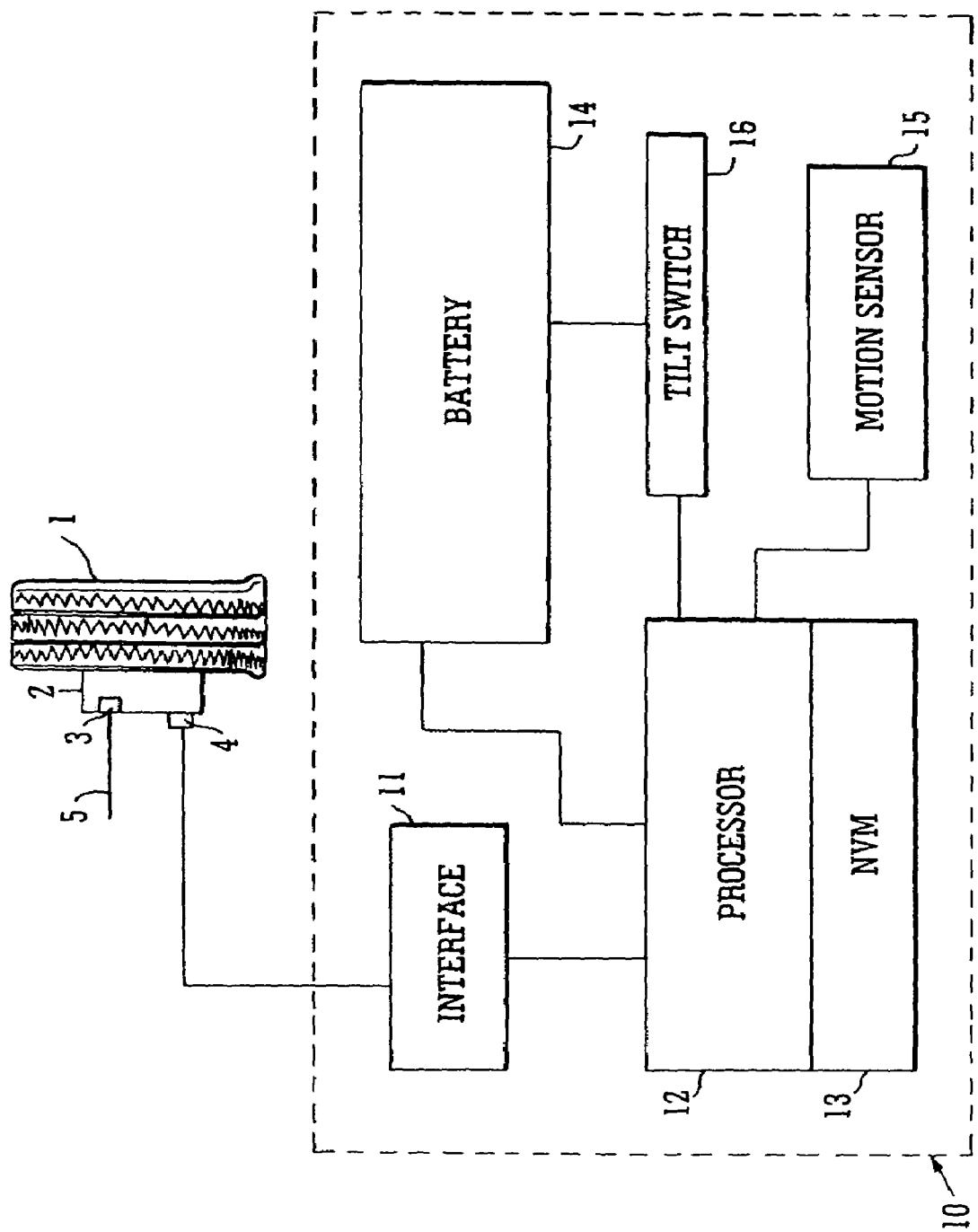
FIG. 1 is a simplified diagram of one embodiment of system of the invention.

The system shown in FIG. 1 is applied to one wheel 1 of an aircraft (not shown) having a carbon-carbon multi-disc brake assembly 2 with a hydraulic actuator mechanism 3. Mechanism 3 is driven through line 5 by a hydraulic system of a type containing an ASCU and known in the art. A brake temperature sensing unit 4, typically a thermocouple, is located adjacent the assembly. To record brake usage, the signal from the thermocouple is input to unit 10 via an interface 11 to processor 12 where the signal is processed by an algorithm in known manner to detect when a brake application has been made. The processor output is recorded in the Non-Volatile Memory (NVM) unit 13 from which information can be downloaded from a suitable access port (not shown) inside the unit 10 or on an external surface of the unit.

In order for unit 10 to be able to function independent of other control systems on the aircraft there is provided within unit 10 battery means 14 for providing power to the unit. During the majority of the unit's life the aircraft will be stationary or in flight, therefore, in order to preserve battery power, and hence extend unit life, a tilt switch 16 and a motion sensor 15 are present. The tilt switch would break the power line from the battery to processor when the undercarriage is retracted and the motion sensor will be used to send the processor into sleep mode during periods of inactivity.

Figure 2:
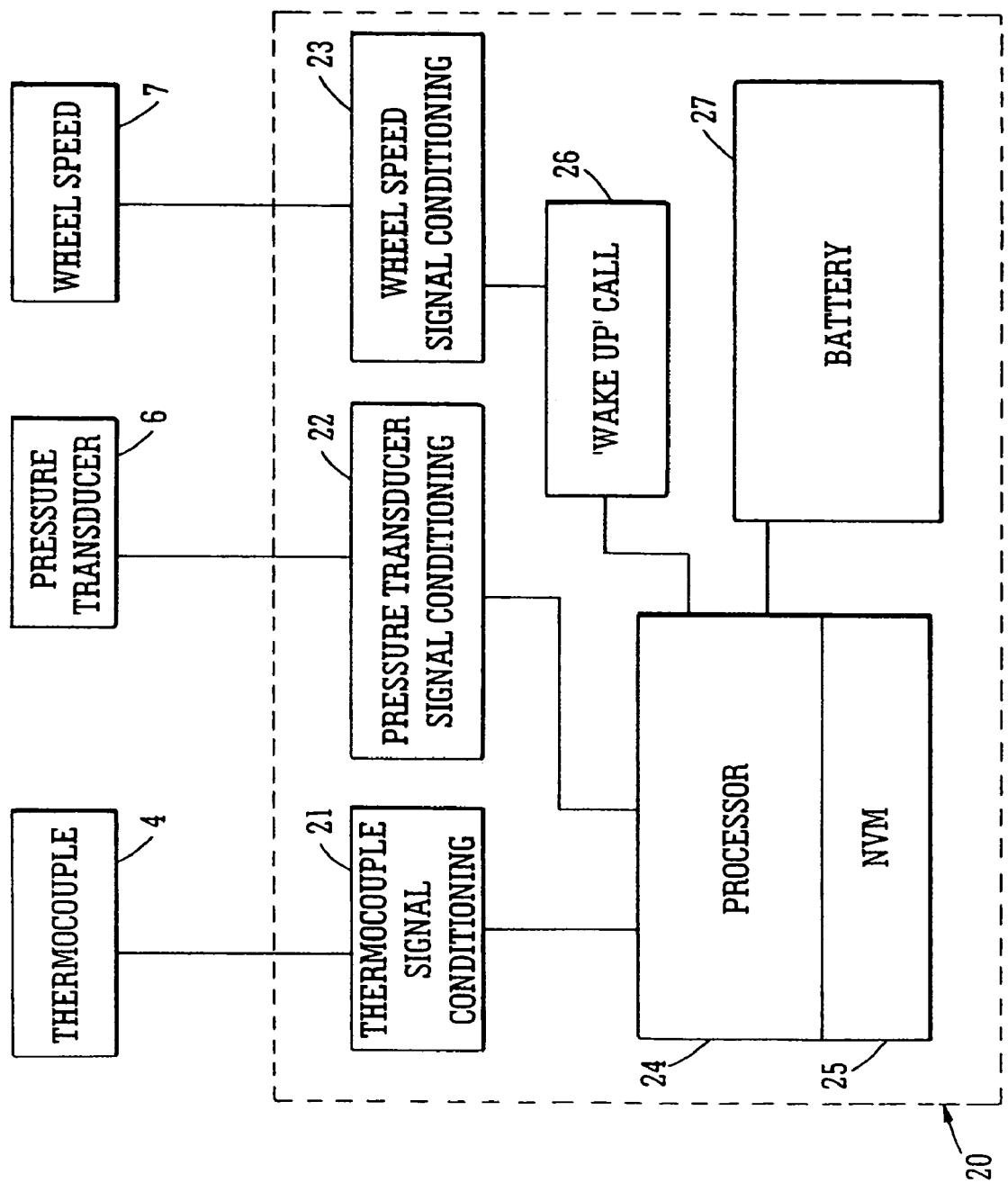
FIG. 2 is a simplified diagram of another embodiment of system of the invention.

Referring to FIG. 2, outputs from the thermocouple 4, brake pressure transducer 6 and wheel speed transducer 7 are taken from an aircraft wheel, brake and brake actuation system (not shown) of a type shown in FIG. 1. These output signals are input to the processor 24 in unit 20 via signal conditioning interfaces 21, 22 and 23. The signals are processed by algorithms to detect when a brake application has been made and the type involved. The processor output is recorded in unit 25 from which information can be downloaded from a suitable access port (not shown) inside the unit 20 or on an external surface of the unit. Records downloaded from the unit will show not only the number of brake applications but also the type of brake application, for example distinguishing between taxi snubs and landings.

A "wake-up" call 26 is again incorporated to preserve the life of the battery 27 and can incorporate functions such as a tilt switch and/or motion sensor as described for the system of FIG. 1.

The systems of FIG. 1 and FIG. 2 represent stand-alone units added to the aircraft to monitor the brake applications, but the processing of the signals to be detailed below can also be incorporated into existing brake control units by modification of hardware and/or software.

Figure 3:
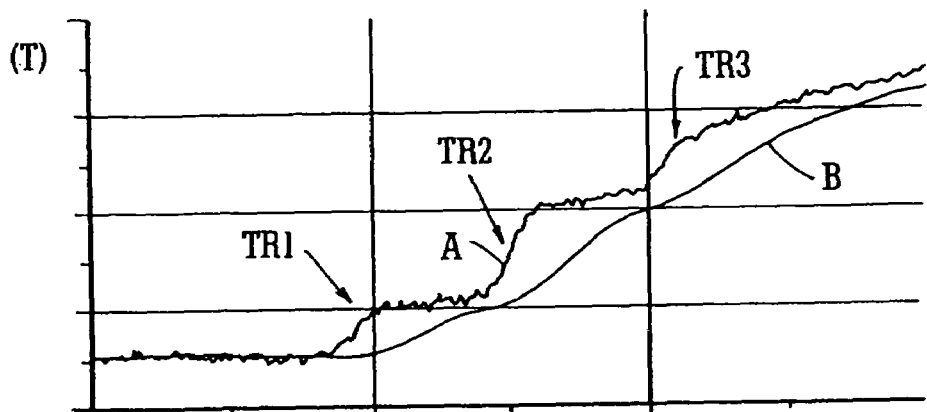
FIG. 3 is a graph relating to a first dynamometer test sequence on a particular aircraft carbon disc brake with temperature T degrees C as the ordinate and time S seconds as the abscissa and showing (A) temperature as represented by a signal from a temperature sensor incorporated in the brake and (B) the same signal after being filtered.

In the systems described above a temperature signal at the Brake Temperature Monitor Sensor (BTMS) is shown at A in FIG. 3 for three taxi snubs performed on a dynamometer for a carbon brake from a regional jet aircraft. Temperature rises TR1, TR2 and TR3 in the order of 2.5° C. are shown but noise resulting from interference by other equipment makes the shape of the trace difficult to see. The system therefore includes means for filtering, differentiation and amplification of the signal.

Figure 4:
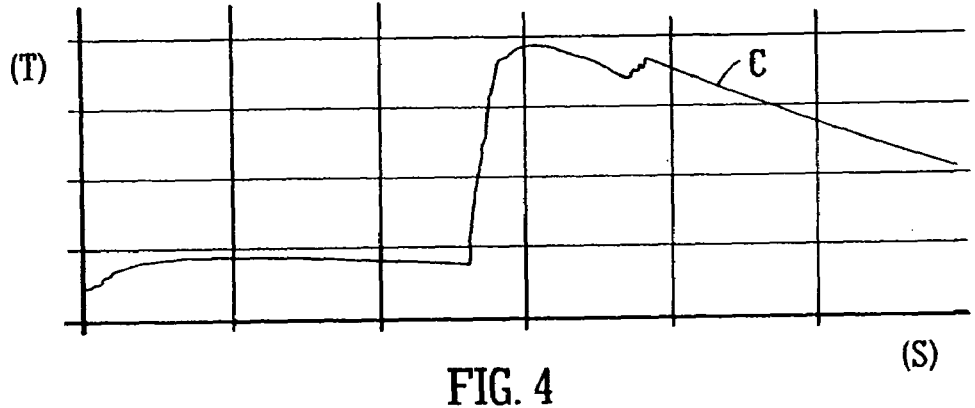
FIG. 4 is a graph similar to FIG. 3 but only showing (c) the filtered signal and for a different dynamometer test sequence.
Figure 5:
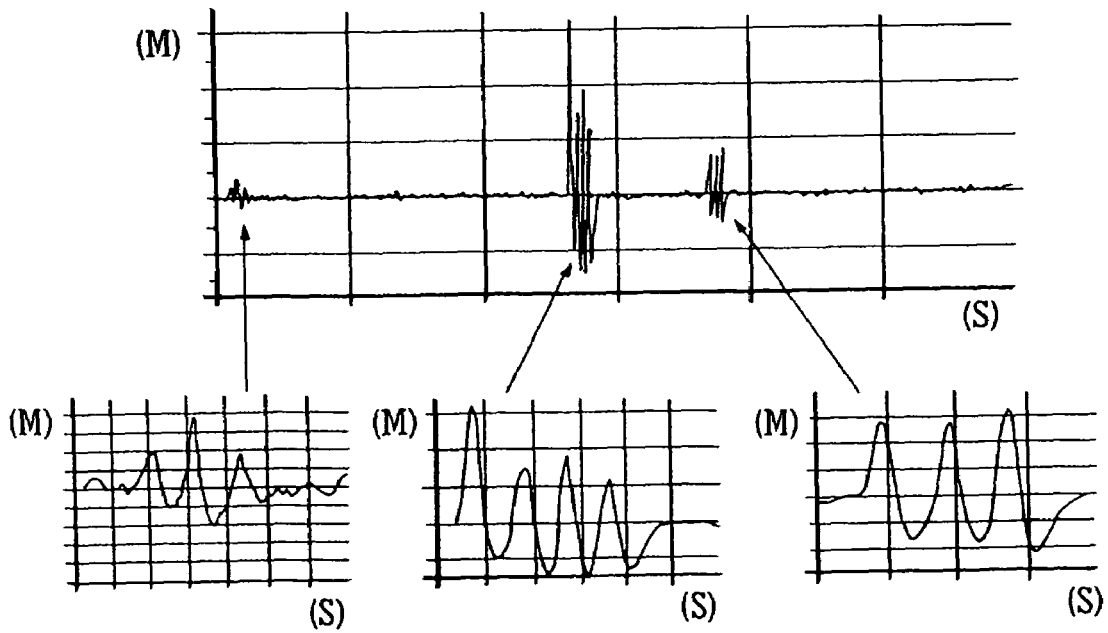
FIG. 5 is a main graph of amplitude M versus time T for the signal of FIG. 4 after numeric processing using a computer, FIG. 5 also comprises three diagrams amplifying respective details of the main graph.

The signal B of FIG. 3 has been processed by a fourth order filter. Although the trace is now smooth the individual temperature rises caused by each brake application are not easily detected so the signal is processed further by differentiating twice and amplified. A suitable computer program performs the necessary numeric algorithm and makes a decision on whether or not a brake application has taken place, if so, the brake application can be recorded. FIG. 4 shows the output for a full dynamometer test sequence consisting of three taxi snubs, one full landing followed by three taxi snubs, a short rest period and then another three taxi snubs. FIG. 5 shows the same output after processing using the algorithm. Peaks above a predefined amplitude in the FIG. 5 output indicate brake applications. From FIG. 5 the peaks clearly identify all the individual brake applications of the dynamometer test program. This dynamometer test work has been found to read across to data taken in aircraft testing. It has been shown in testing with the processed temperature signal that a reliable indication of a brake application can be detected even where temperature changes of less than 1° C. are seen.

Analysis of the output is more suited to some aircraft than others, depending on the positioning of the BTMS in the brake. The optimum position for temperature sensing will depend on the design of the brake in question. In some brakes the optimum position might be close to the center of the heat pack. Generally the closer the temperature sensor is to the optimum position in the brake the more sensitive will be the temperature detection during a brake application. For example, the sensitivity for temperature measured at the center of a four rotor brake might be several times greater than elsewhere within the brake.

The processed temperature data can be recorded on its own to give an indication of the number of brake applications using apparatus such as is represented in the diagram of FIG. 1, or combined with wheel speed and/or brake pressure to give a more detailed record of the type of brake application that has been made, i.e. taxi snub or landing using apparatus as shown in FIG. 2.

The invention is not limited to the embodiment shown. The signals may be derived from and processed by components in existing brake control units. The temperature may be sensed or measured using a device other than a thermocouple.

Figure 6:
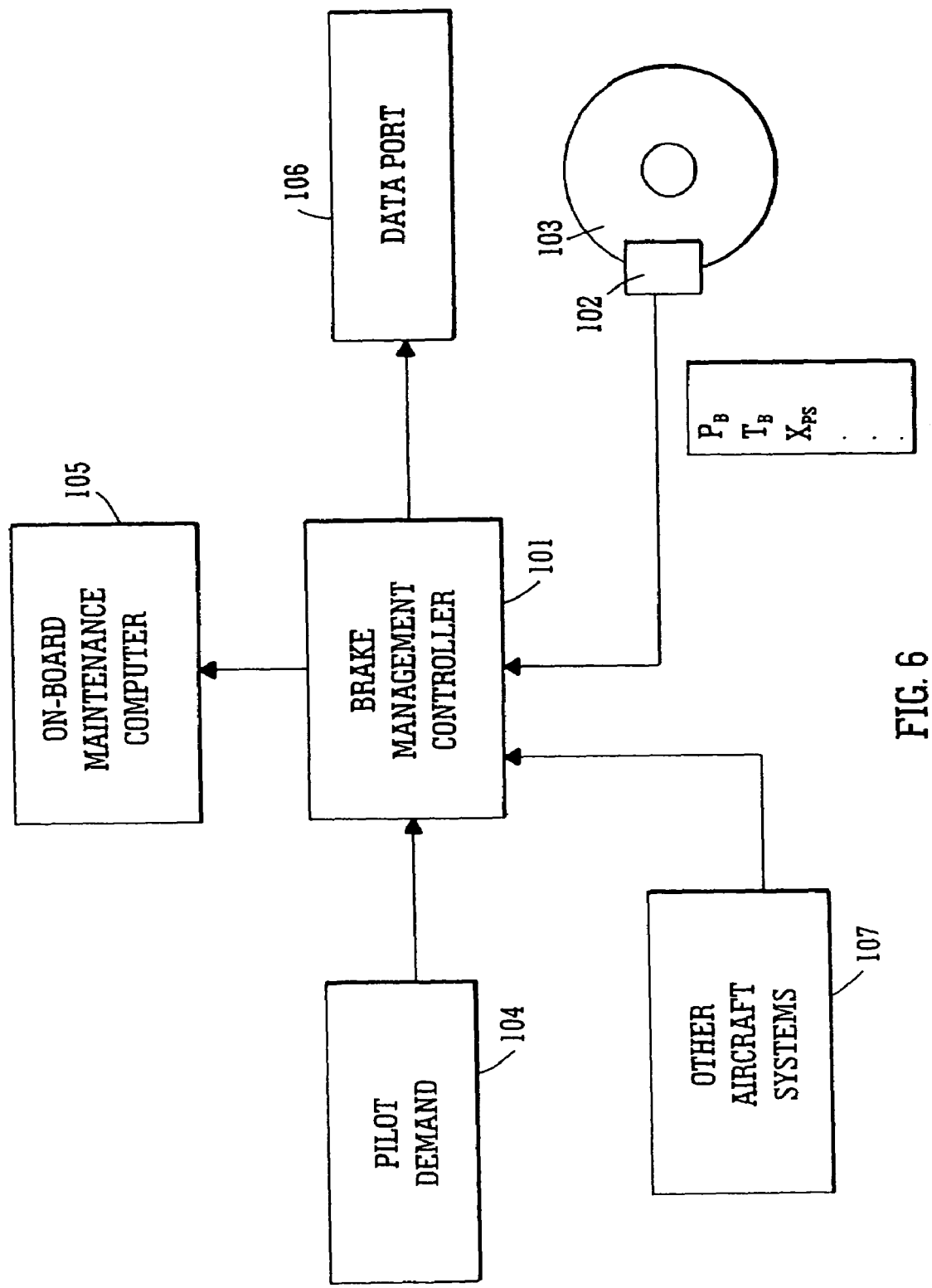
FIG. 6 is a simplified circuit diagram of a brake condition monitoring system.

The system shown in FIG. 6 incorporates an electronic brake management controller 101 of a type known in the art to manage all aspects of brake control including monitoring pilot braking demand and controlling the application of pressure to the brake in accordance with pilot demand and detected skid activity. Pilot brake demand inputs to the controller are provided by monitoring means 104. These inputs include but are not limited to pedal deflection and pressure demand. The controller will also monitor signals from sensors in the wheel 103 and brake 102 including but not limited to wheel speed, temperature, pressure stator position, brake torque, brake fluid pressure. Signals from sensors in other areas of the undercarriage such as, for example the tire and axle could also be used to monitor the condition of a range of components and assemblies forming part of the aircraft landing gear. Also, information such as aircraft weight could be inputted to the controller from one or more other a/c systems (these are represented by block 107 in the drawings).

The controller analyzes the signals relating to pilot demand and the brake to evaluate a brake performance signature indicative of how the brake is performing. This brake performance signature could be compared against the signature for a heat pack in as new condition. Alternatively, over a period of time a record of a brake's performance can be built up that will allow statistical analysis showing trends in the brake performance signature and allow the controller to predict an expected signature for a given brake application. Where deviations from the expected signature occur the controller would be able to identify potential brake problems that might have caused the variation.

Problems identified could then be signaled to an on-board maintenance computer 105 capable of alerting the crew or ground maintenance staff. Alternatively, or additionally data from the controller could be downloaded from a data port by ground staff during routine maintenance or pre-flight inspection. Such a port 106 could also be accessed by the brake supplier for downloading information about brake service, including number of brake applications and type of brake application. This service information could be used on its own or in combination with condition monitoring data for brake life prediction and/or commercial purposes.

Such a brake management controller could also manage the auto-braking function of the braking system.

In the system of FIG. 6, the extent of heat pack wear is estimated by monitoring pilot brake demand and signals from wheel speed, brake fluid pressure and brake heat pack temperature. For a given set of operating conditions, for example, brake demand and speed, the controller compares the measured temperature rise with an expected temperature rise. The difference between these values gives an indication of heat pack wear with a greater degree of wear resulting in a greater temperature rise. Additionally, the controller incorporates a threshold value of temperature difference for any braking requirement, the threshold value representing the difference between the temperature expected for a new heat pack and a fully worn heat pack. As this threshold value of temperature difference is approached, the flight crew or ground crew are alerted that the heat pack is approaching the wear limit. Alternatively, the controller or onboard maintenance computer could send a signal using known communications technology, such as for example via satellite link, to the aircraft operator's maintenance base or the brake supplier's base so that maintenance action may be planned and replacement parts provisioned. Such signals could be sent on a regular basis to allow external monitoring of brake condition or once only when the wear reaches a predetermined value to alert that maintenance and spares provisioning is required. The timing of such an alert signal could allow for the lead-time for supply of the parts thereby minimizing stock levels and hence reducing working capital of the brake supplier and aircraft operator.

The heat pack might lose mass for reasons other than wear, for example, by oxidation of carbon friction material or loss of a number of drive tenons. Such loss of mass will result in a larger increase in temperature in the brake performance signature than would be seen if the fault were not present.

Where the reduction of mass is caused by loss of a number of drives in the heat pack, this would result in a step increase in the temperature rise during a brake application when compared to the temperature rise predicted from statistical analysis of brake signature trends for a number of stops over a period of time. The size of the step increase in temperature during brake applications would be greater the more drives were removed from the discs in the heat pack.

Estimates of heat pack mass can also be made from $X_{ps}$ and (delta)T (refer to Table 1). If these estimates of mass do not match this would suggest some form of damage such a broken drives or oxidation.

A disc with all drives broken off is detected in the system of FIG. 6 by monitoring signals representing brake torque, brake temperature and the brake acoustic signature. If the drive tenons on a rotor disc or double stator disc are broken this will result in the brake having two less friction surfaces when the brake is applied. For a given brake demand, brake pressure, duration of brake application and wheel speed there will be a correspondingly lower torque generated because of the loss of the two friction faces and a resulting lower brake temperature than would be seen under the same brake application conditions with a heat pack where all friction surfaces are operational. The number of ineffective friction surfaces in a brake will depend on the extent of damage to the heat pack. The deviation in brake torque and temperature from expected values could be analyzed to determine how many friction faces were ineffective.

In comparison, under auto-braking conditions, if the drives on a disc are broken the brake will be controlled to achieve a predetermined brake torque and the system will deliver an increased brake fluid pressure to achieve this required torque. Therefore, under auto-braking a pressure higher than expected would indicate a disc with broken drive tenons. The deviation in brake pressure from that expected could be analyzed to give an indication of how many friction surfaces were no longer effective, so providing an indication of the extent of damage.

In a brake with broken drive tenons on a disc, the acoustic signature of the brake during brake applications will be different from the acoustic signature of a brake with the same amount of wear and all friction faces working effectively. The acoustic signature is detected by a microphone. The signal from the microphone is input to the brake management controller for analysis to detect variations from the expected signature.

Other scenarios outlined in Table 1 could be detected and reported in a similar way to those scenarios described above. The scenarios outlined in Table 1 are to be considered as illustrative examples of brake conditions that could be detected and not an exhaustive list.

References herein to brake odor, scent and olfactory sensing applies to the process using appropriate transducers of detecting the presence and/or level of certain gases or combinations thereof and/or of vapor or particulates in and around the brake apparatus.

TABLE 1

| | Expected Change in Signature | |
|---|---|---|
| Failure Modes | For Constant Pressure Demand | For Autobrake (deceleration) demand |
| Cracked Brake Disc | High $T_B$ and/or ΔAcoustic | High $T_B$ and/or ΔAcoustic |
| Broken Drive | Low τ and Low $T_B$ and/or ΔAcoustic | High P |
| Missing Brake Disc | Large $\Delta X_{PS}$ and Low τ | Large $\Delta X_{PS}$ and High P |
| Residual Torque | $\Delta T_B$ and/or Δτ and No $\Delta Pedal/\Delta X_{PS}/\Delta P$ | $\Delta_B$ and/or Δ and No $\Delta Pedal/\Delta X_{PS}/\Delta P$ |
| Excessive Oxidation | Low τ and/or High $T_B$ | High P and High $T_B$ |
| Excessive Spline Friction | Variation in $T_B$ across brake | Variation in $T_B$ across brake |
| Excessive Contamination | ΔOlfactory | ΔOlfactory |
| Cracked Torque Tube | ΔAcoustic | ΔAcoustic |
| Tyre Fuse Plug Leakage | Low $P_{Tyre}$ | Low $P_{Tyre}$ |
| Wheel Bearing Fatigue Failure | High $T_{Bearing}$ | High $T_{Bearing}$ |

Note:
Low/High refers to lower/higher than expected
Possible sensor inputs:
$P_s \Rightarrow$ Brake Fluid Pressure
$\omega \Rightarrow$ Wheel Speed
$\tau \Rightarrow$ Brake Torque
$X_{Pedal} \Rightarrow$ Pedal Deflection
$t \Rightarrow$ Time
Acoustic $\Rightarrow$ Brake Acoustic Signature
$T_B \Rightarrow$ Brake Temperature, measured at various positions through brake
$X_{PS} \Rightarrow$ Pressure Stator Position
$\alpha \Rightarrow$ Acceleration
Olfactory $\Rightarrow$ Scent
$T_{Bearing} \Rightarrow$ Wheel bearing Temperature
$T_{Tyre} \Rightarrow$ Tyre Temperature
$P_{Tyre} \Rightarrow$ Tyre Pressure
$\Delta \Rightarrow$ Change in

We claim:

1. A method of monitoring the usage of aircraft brake members having facing friction surfaces, the method comprising:
   detecting each actuation of the brake members;
   making a separate record of each actuation in which there is relative movement of the facing friction surfaces which causes wear; and
   determining brake usage from that record, the method of determining relative movement of the facing friction surfaces which causes wear including the steps of:
   detecting a change in temperature of the brake members on actuation thereof;
   generating signals according to the detected changes in temperature;
   twice differentiating said signals and;
   identifying from said signals actuations of the brake members which cause a change in temperature that is an increase above a pre-selected threshold value by comparing said twice differentiated signals with said pre-selected thereshold value and identifying those actuations that cause a change in temperature that is an increase above said pre-selected threshold value as actuations in which there is relative movement of the facing friction surfaces that causes wear.

2. A method according to claim 1, in which each actuation of the brake members that is judged not to cause wear is not recorded.

3. A method according to claim 1, wherein the records of actuation of the brake members are processed to generate expected brake output values for respective brake inputs that cause the actuations.

4. A method according to claim 3, wherein the records of actuation comprise actual brake output values and determining brake usage comprises comparing an actual brake output value with the expected brake output for the respective brake input to determine a brake wear condition.

5. A method according to claim 4, comprising initiating a brake maintenance action based on a determined brake wear condition.

6. A method according to claim 3, wherein the records of actuation comprise actual brake output values and determining brake usage comprises comparing an actual brake output value with the expected brake output for the respective brake input to determine a brake fault condition.

7. A method according to claim 6, comprising initiating a brake maintenance action based on a determined brake fault condition.

8. Aircraft brake monitoring apparatus for monitoring usage of aircraft brakes that comprise carbon-carbon multi-discs, said apparatus comprising:
   at least one sensor for sensing a brake output parameter and providing signals indicative of values of the sensed brake output parameter;
   a differentiator for twice differentiating said signals;
   a processor for receiving and processing said twice differentiated signals using at least one algorithm to determine when a wear generating application of the brakes has been made; and
   a store in which a record of each wear generating application is stored.

9. Apparatus according to claim 8, wherein said sensed brake output parameter is temperature and said processor only determines a wear-generating brake application when a temperature change above a predetermined threshold value is detected.

10. Apparatus according to claim 9, arranged such that when said processor determines that a brake application is not a wear-generating application, a record of the non-wear generating application is not made.

11. Apparatus according to claim 8, operable to generate expected brake output parameter values based on the sensed brake output parameter values.

12. Apparatus according to claim 11, comprising a comparator for comparing expected brake output parameter values with said sensed brake output parameter values to determine at least one condition of the aircraft brake.

13. Apparatus according to claim 12, wherein said at least one condition is a wear condition.

14. Apparatus according to claim 12, wherein said at least one condition is a fault condition.

15. Apparatus according to claim 12, operable to instigate a maintenance action based on said at least one condition.

16. An aircraft comprising an aircraft brake monitoring system according to claim 8.

* * * * *